(12) United States Patent
Dowling

(10) Patent No.: US 7,293,110 B2
(45) Date of Patent: *Nov. 6, 2007

(54) FEDERATED MULTIPROTOCOL COMMUNICATION

(76) Inventor: Eric Morgan Dowling, P.O. Box 025635, Miami, FL (US) 33102-5635

( * ) Notice: Subject to any disclaimer, the term of this patent is extended or adjusted under 35 U.S.C. 154(b) by 0 days.

This patent is subject to a terminal disclaimer.

(21) Appl. No.: 11/410,094

(22) Filed: Apr. 25, 2006

(65) Prior Publication Data

US 2006/0195551 A1   Aug. 31, 2006

Related U.S. Application Data

(63) Continuation of application No. 09/698,882, filed on Oct. 27, 2000, now Pat. No. 7,035,932.

(51) Int. Cl.
G06F 15/16 (2006.01)
(52) U.S. Cl. ............... 709/249; 709/217; 709/218; 709/250; 370/331; 370/342; 455/432.1; 455/436
(58) Field of Classification Search ............. 709/217, 709/218, 219, 230, 227, 249, 250; 370/331, 370/401, 342, 349, 469; 455/432.1, 436, 455/428
See application file for complete search history.

(56) References Cited

U.S. PATENT DOCUMENTS

| | | | |
|---|---|---|---|
| 5,081,707 A | 1/1992 | Schorman et al. |
| 5,313,582 A | 5/1994 | Hendel et al. |
| 5,365,451 A | 11/1994 | Wang |
| 5,392,390 A | 2/1995 | Crozier |
| 5,416,473 A | 5/1995 | Dulaney |
| 5,416,842 A | 5/1995 | Aziz |
| 5,436,960 A | 7/1995 | Campana, Jr. et al. |
| 5,479,472 A | 12/1995 | Campana et al. |
| 5,487,100 A | 1/1996 | Kane |
| 5,561,704 A | 10/1996 | Salimando |

(Continued)

FOREIGN PATENT DOCUMENTS

EP    1017197    * 5/2000

OTHER PUBLICATIONS

Client-Server computing in mobile environments by Jing et al.; vol. 31 issue 2, Jun. 1999 ACM Computing Surveys (CSUR).*

(Continued)

*Primary Examiner*—Frantz B. Jean
(74) *Attorney, Agent, or Firm*—Eric M. Dowling

(57) ABSTRACT

Methods, apparatus, and business techniques are disclosed for use in distributed communication systems comprising a plurality of communication protocols. In one embodiment a first air interface is used to initiate communication between a wireless client and a remote server at least partially using a first wireless access point. A remote server aids in roaming by downloading to the mobile unit a software module that supports a communication protocol feature for use by the mobile unit to aid in communication after the roam operation. The wireless client can thereby communicate with a second wireless access point using said second air interface protocol. Exemplary embodiments of the present invention are disclosed that focus on toll-tag and electronic-commerce related highway systems, distributed federated wireless access systems, and wide area wireless system capacity augmentation.

42 Claims, 4 Drawing Sheets

U.S. PATENT DOCUMENTS

| | | | |
|---|---|---|---|
| 5,565,874 A | 10/1996 | Rode et al. | |
| 5,570,417 A | 10/1996 | Byers | |
| 5,572,528 A | 11/1996 | Shuen et al. | |
| 5,603,054 A | 2/1997 | Theimer et al. | |
| 5,627,549 A | 5/1997 | Park et al. | |
| 5,689,825 A | 11/1997 | Averbuch et al. | |
| 5,745,695 A | 4/1998 | Gilchrist et al. | |
| 5,754,786 A | 5/1998 | Diaz et al. | |
| 5,767,795 A | 6/1998 | Schaphorst | |
| 5,771,353 A | 6/1998 | Eggleston et al. | |
| 5,790,642 A | 8/1998 | Taylor et al. | |
| 5,796,728 A | 8/1998 | Rondeau et al. | |
| 5,809,415 A | 9/1998 | Rossmann | |
| 5,862,339 A | 1/1999 | Bonnaure et al. | |
| 5,864,764 A | 1/1999 | Thro et al. | |
| 5,867,110 A | 2/1999 | Naito et al. | |
| 5,887,254 A | 3/1999 | Halonen | |
| 5,889,845 A | 3/1999 | Staples | |
| 5,898,680 A | 4/1999 | Johnstone et al. | |
| 5,900,825 A | 5/1999 | Pressel et al. | |
| 5,949,776 A | 9/1999 | Mahany et al. | |
| 5,959,577 A | 9/1999 | Fan et al. | |
| 5,961,590 A | 10/1999 | Mendez et al. | |
| 5,987,062 A | 11/1999 | Engwer et al. | |
| 6,005,926 A | 12/1999 | Mashinsky | |
| 6,023,708 A | 2/2000 | Mendez et al. | |
| 6,029,141 A | 2/2000 | Bezos et al. | |
| 6,035,104 A | 3/2000 | Zahariev | |
| 6,052,600 A | 4/2000 | Fette et al. | |
| 6,061,565 A | 5/2000 | Innes et al. | |
| 6,073,165 A | 6/2000 | Narasimhan et al. | |
| 6,085,192 A | 7/2000 | Mendez et al. | |
| 6,101,531 A | 8/2000 | Eggleston et al. | |
| 6,115,754 A | 9/2000 | Landgren | |
| 6,134,432 A | 10/2000 | Holmes et al. | |
| 6,151,606 A | 11/2000 | Mendez et al. | |
| 6,154,212 A | 11/2000 | Erick et al. | |
| 6,154,461 A | 11/2000 | Sturniolo et al. | |
| 6,175,589 B1 | 1/2001 | Cummings | |
| 6,185,204 B1 | 2/2001 | Voit | |
| 6,185,205 B1 | 2/2001 | Sharrit et al. | |
| 6,199,045 B1 | 3/2001 | Giniger et al. | |
| 6,201,962 B1 | 3/2001 | Sturniolo | |
| 6,205,211 B1 | 3/2001 | Thomas et al. | |
| 6,219,694 B1 | 4/2001 | Lazaridis | |
| 6,230,012 B1 | 5/2001 | Willkie et al. | |
| 6,236,652 B1 | 5/2001 | Preston et al. | |
| 6,243,572 B1 | 6/2001 | Chow et al. | |
| 6,256,498 B1 | 7/2001 | Ludwig | |
| 6,269,402 B1 | 7/2001 | Lin et al. | |
| 6,308,281 B1 | 10/2001 | Hall et al. | |
| 6,327,533 B1 | 12/2001 | Chou et al. | |
| 6,359,880 B1 | 3/2002 | Curry et al. | |
| 6,411,679 B1 | 6/2002 | Khasnabish | |
| 6,452,910 B1 | 9/2002 | Vij et al. | |
| 6,456,603 B1 | 9/2002 | Ismailov et al. | |
| 6,470,179 B1 | 10/2002 | Chow et al. | |
| 6,470,447 B1 | 10/2002 | Lambert et al. | |
| 6,487,406 B1 | 11/2002 | Chang et al. | |
| 6,515,985 B2 | 2/2003 | Shmulevich et al. | |
| 6,515,997 B1 | 2/2003 | Feltner et al. | |
| 6,522,875 B1 | 2/2003 | Dowling et al. | |
| 6,535,493 B1 | 3/2003 | Lee et al. | |
| 6,546,261 B1 | 4/2003 | Cummings | |
| 6,546,425 B1 | 4/2003 | Hanson et al. | |
| 6,549,625 B1 | 4/2003 | Rautila et al. | |
| 6,563,919 B1 | 5/2003 | Aravamudhan et al. | |
| 6,571,290 B2 | 5/2003 | Selgas | |
| 6,574,239 B1 | 6/2003 | Dowling et al. | |
| 6,580,700 B1 * | 6/2003 | Pinard et al. | 370/332 |
| 6,584,321 B1 | 6/2003 | Coan et al. | |
| 6,594,488 B1 | 7/2003 | Chow et al. | |
| 6,600,734 B1 | 7/2003 | Gernert et al. | |
| 6,639,550 B2 | 10/2003 | Knockeart | |
| 6,643,684 B1 | 11/2003 | Malkin et al. | |
| 6,650,899 B1 | 11/2003 | Stumpert | |
| 6,654,359 B1 | 11/2003 | La Porta et al. | |
| 6,654,615 B1 | 11/2003 | Chow et al. | |
| 6,654,786 B1 | 11/2003 | Fox et al. | |
| 6,680,923 B1 | 1/2004 | Leon et al. | |
| 6,687,243 B1 | 2/2004 | Sayers et al. | |
| 6,693,886 B1 | 2/2004 | Haikonen et al. | |
| 6,704,303 B1 | 3/2004 | Bowman-Amulah | |
| 6,708,221 B1 | 3/2004 | Mendez et al. | |
| 6,714,536 B1 | 3/2004 | Dowling | |
| 6,724,833 B1 | 4/2004 | Cummings | |
| 6,778,832 B1 | 8/2004 | Chow et al. | |
| 6,804,720 B1 | 10/2004 | Vilander et al. | |
| 6,826,405 B2 | 11/2004 | Dovaik et al. | |
| 7,085,260 B2 * | 8/2006 | Karaul et al. | 370/352 |
| 2002/0069284 A1 * | 6/2002 | Slemmer et al. | 709/227 |

OTHER PUBLICATIONS

"JAIN: A new approach to services in communication networks," by John de Keijzer, et al., IEEE Communications Magazine, vol. 38, No. 1, Jan. 2000.

"JAIN protocol API's," by Bhat et al., IEEE Communications Magazine, vol. 38, No. 1, Jan. 2000.

"Java call control, coordination and transactions," by R. Jain et al., IEEE Communications Magazine, vol. 38, No. 1, Jan. 2000.

"Enabling network management using Java technologies," by Jae-oh Lee, IEEE Communications Magazine, vol. 38, No. 1, Jan. 2000.

"Fast and scalable handoffs for wireless internetworks," Proc. 2nd ACM annual international conference on mobile computing and networking, Nov. 1996.

"Enabling components for multistandard software radio base stations," wireless personal communications, vol. 13, pp. 145-166, 2000.

"Comments of the national telecommunications and information administration," http://www.ntia.doc.gov.ntiahome/fccfilings/2000/sdrnoi61600.htm.

"JTRS—An open distributed-object computing software radio architecture, gateway to the new millenium," 18th Digital Avionics systems conference, Oct. 1999.

"Mobility Management in Next Generation Wireless Systems," Akyidiz et al., Proceedings of the IEEE, vol. 87, No. 8, pp. 1347-1384, Aug. 1999.

"Beyond Software Radio, towards re-configurability across the whole System and across networks," Jorge M. Piereia, IEEE Vehiclular Technology Conference 1999.

"Mode switching and software download for software defined radio: the SDR forum approach," Cummings et al., IEEE Communications Magazine, Aug. 1999.

"Advanced Wireless Terminals," Lettieri et al., IEEE Personal Communcations, Feb. 1999.

* cited by examiner

FEDERATED MULTIPROTOCOL COMMUNICATION

This application is a continuation of U.S. patent application Ser. No. 09/698,882, filed Oct. 27, 2000, now U.S. Pat. No. 7,035,932.

BACKGROUND OF THE INVENTION

1. Field of the Invention

This invention relates generally to mobile data network infrastructure systems to support communication with clients that employ software radio technology. More particularly, the invention relates to client-server systems used to allow a client to establish communication with a federation of wireless access points using initially unknown and variable air interface protocols.

2. Description of the Related Art

Software radio based systems have been developed to address the problem of ever changing sets of protocols. Different classes communication devices tend to use different communication protocols and are therefore inoperable together. Software radio moves the digitization process as close to the antenna as possible. After digitization, digital signal processing techniques (DSP) are used to provide the physical layer interface. In this way, the physical layer of a given air interface may be specified by DSP software. Similarly, the link layers and above can be specified in software. This provides a radio system whose operation can be almost entirely specified in software. Software radio has the additional advantage that a first air interface protocol may be used to download a software module to implement a second air interface protocol. This provides a great potential for inter-system roaming.

Object based technologies have been used to implement software radio concepts. For example, the Java™ API's for Integrated Networks (JAIN™) is a protocol based on the Java™ object oriented programming language and virtual machine from Sun Microsystems Inc. JAIN defines a set of communication protocol application programmer interfaces (API's) that implement various protocols to include call setup, IP telephony, and management functions. The advantage of using a language such as Java is that Java software runs on a virtual machine and is therefore platform independent. This allows a single software module to be downloaded to a variety of mobile devices, for example, using different hardware architectures and processor implementations.

Distributed object technology is also known in the art. Distributed object technology allows object-oriented classes to be defined that include a server-side remote object and a client-side object stub, also called a "proxy." The server-side remote object implements one or more services and a communication protocol to communicate with the client-side stub. The client-side stub provides the client with an API ("interface" in object-oriented programming terminology) to call functions (i.e., "invoke methods" in object oriented programming terminology). When a method is invoked on the client-side stub, a remote procedure call and a set of parameters are marshaled into a message and sent across a communication channel to the server-side remote object. The server-side remote object then receives the message, unmarshals the parameters, invokes the corresponding method on behalf of the client, marshals a set of results into a message, and sends the message back to the client.

A problem with many existing communication networks is lack of interoperability. First and second wireless networks with or without overlapping coverage areas may use different protocols and be incompatible. Suppose the second network provides a service not provided by the first network, for example a higher speed or lower cost access link. It would be desirable to have an efficient handoff procedure to allow the mobile to transition its protocol stack from the first network to the second network to access the service of the second network.

Prior art mobile networks provide roaming and allow users to be handed off from one type of system to another. For example, a prior art "dual mode cellular phone" supports a first protocol such as IS-136 digital cellular and a second protocol such as AMPS analog cellular. To maintain a broader coverage area, the cell phone is capable of connecting to either type of cellular system. Some cellular systems allow a single call may be carried during by more than one air interface protocol. For example, during a first time interval the call is carried by an IS-136 link and during a second time interval the call is carried by an AMPS link. Over-the-air software downloading of new communication protocol software modules to software radios is known in the art. However, efficient methods are lacking to implement roaming using protocol-software downloads.

Certain types of cellular phones and wireless data devices allow a user to roam between an indoor network (e.g., wireless LAN or picocell network) and an outdoor network (e.g., cellular or PCS wide coverage area network). For example, a user may access the network using enterprise level wireless access points while in a building, but when the user walks outside and gets in his car, the call may be handed off to a cellular network. This allows users to access lower cost (e.g., no usage charge) services while in the vicinity of a home station and to use leased services (e.g., with usage charge) while away from the home station. This is another variant of the concept of a dual mode phone.

While dual-mode phones and wireless data devices are quite useful they have drawbacks. A dual-mode phone can readily be extended to the concept of a "multi-mode phone." A multi-mode phone or data device implements two or more protocol stacks to communicate with two or more types of networks. The trouble with implementing multi-mode phones is cost and versatility. In prior art phones the two or more supported protocols tend to require duplication of many hardware and software components. The software radio concept can be used to minimize the duplication of hardware resources and has the advantage that software can be dynamically downloaded. This allows the software radio to adapt to a changing environment by downloading new communication software. In current systems, handoffs are typically handled at the link layer. While current handoff techniques can be used to hand a call of from a first protocol to a second protocol (e.g., IS-136 to AMPS), prior art handoff mechanisms are not optimized for situations where the second protocol is unknown to the mobile and therefore requires a software download and a reconfiguration operation in the software radio. Moreover, prior art handoff procedures are generally controlled at the link layer by a network operator. The user has little or no control over handoffs and cannot use a handoff to shop between services to optimize a set of user criteria.

The prior art lacks a network infrastructure to coordinate the use of a loose federation of networks having protocols initially unknown to a roaming mobile. A loose federation of networks is a form of an internetwork that includes a plurality of wireless access points supplied by associates.

The wireless access points may involve different protocols and may be owned by individual people, local businesses, or wireless access service providers. A heretofore lacking network infrastructure would be needed to coordinate the federation of wireless access points to allow a mobile client to obtain wireless access from the federation.

As wireless access technologies evolve, there will be an increasing variety of air interface protocols. These air interface protocols will include general purpose access protocols, local area network (LAN) protocols, short range protocols such as Bluetooth and its successors, plus short range broadcast/transponder protocols as are used in intelligent transportation systems (ITS). While it is known that software radio can use a first airlink to download a software definition for a second airlink, improved methods are needed to manage and configure a mobile to efficiently make use of a heterogeneous network comprising a variety of protocols.

It would be desirable to have a system to provide a user with a means to efficiently select and use a plurality of initially unknown protocols in order to optimize a user-specified network performance criterion in a loosely federated network. It would be desirable to be able to use this optimization to control the dynamic loading an initially unknown protocol. It would be desirable to have a set of client-side and server-side systems and methods to allow a mobile device to access different services using different protocols to achieve an end such as faster access speeds, lower cost access, or to access a broader range of services. It would be desirable for a client to have a server act on behalf of the client to select the best access protocol to meet the client's needs. It would be desirable to provide a software architecture that minimizes the amount of software that needs to be downloaded to the mobile to support a new protocol. It would be desirable to have business structures and business methods to allow a federated set of associates to augment a network with additional wireless access points (e.g., picocell level), thereby increasing the system capacity of a wide area mobile network. It would be desirable to have business structures and methods to allow a federated set of associates to supply a set of picocell level wireless access points in order to sell locally available wireless access services to a broad customer base.

SUMMARY OF THE INVENTION

The present invention solves these and other problems by providing systems and methods to enable a mobile unit to access a federation of associated wireless access providers. The present invention includes various aspects as outlined in here and in further detail in the detailed description.

A first aspect of the present invention involves a wireless terminal. The wireless terminal includes an upper layer software module that communicates with a corresponding peer-upper layer communication module in a network server. The terminal also includes a transceiver coupled to an air-interface antenna. The transceiver is operative to support the transmission of one or more upper layer communication packets with the network server. The wireless terminal also includes a software radio configuration module. The transceiver is operative to perform a data transaction with the network server to obtain an object defining a class. This object is passed to the software radio configuration module. The software radio configuration module uses the object to reconfigure at least one lower protocol layer in the transceiver. The transceiver is then operative to support the transmission of one or more upper layer communication packets using the reconfigured protocol layer. In some embodiments a first and a second transceiver are used to support the first and second lower layer protocols. Some embodiments also include a GPS receiver. The terminal sends a location indication to the server to help identify a protocol to be used by the wireless terminal. The wireless terminal of the present invention uses a configurable protocol stack software architecture that allows applications to operate over a variety of lower layers and also allows the lower layers to be efficiently reconfigured.

Another aspect of the present invention involves a method of processing in a network server. The network server receives from a remote client a representation of geographical location. The representation is transmitted at least partially via a first air interface protocol to a first wireless access point. The server next sends to the remote client an indication of a second air interface protocol and a set of parameters for use in accessing a second wireless access point using the second air interface. The server then sends to the second wireless access point an indication of the remote client and a code requesting the second wireless access point to provide wireless access to the remote client.

Still another aspect of the present invention deals with a method of providing federated wireless access services with the assistance of associates. The federated access services are controlled by a network server and are made available to the users of a wide area wireless access system. A plurality of associates is enrolled using an on-line registration system. Each associate indicates an air interface protocol used by a local wireless access point supplied by the associate. A signal is received from a wireless client. This signal identifies a proximity of the wireless client and helps the server choose one of the wireless access points to supply access to the client. Next the server sends to the wireless client an indication of a second air interface protocol and a set of parameters for use in accessing a second wireless network access point using the second air interface. The second wireless network access point is supplied by one of the associates. The server next sends to the second wireless network access point an indication of the remote client and a code requesting the second wireless network access point to provide wireless access to the remote client. This method allows a wireless user to switch, for example from a CDMA macrocellular network to a local area network operated by an associate.

The apparatus and systems discussed above are described in further detail in the detailed description below. Many variations of the aforementioned aspects are disclosed.

BRIEF DESCRIPTION OF THE FIGURES

The various novel features of the present invention are illustrated in the figures listed below and described in the detailed description that follows.

DETAILED DESCRIPTION OF THE PREFERRED EMBODIMENTS

Figure 1:
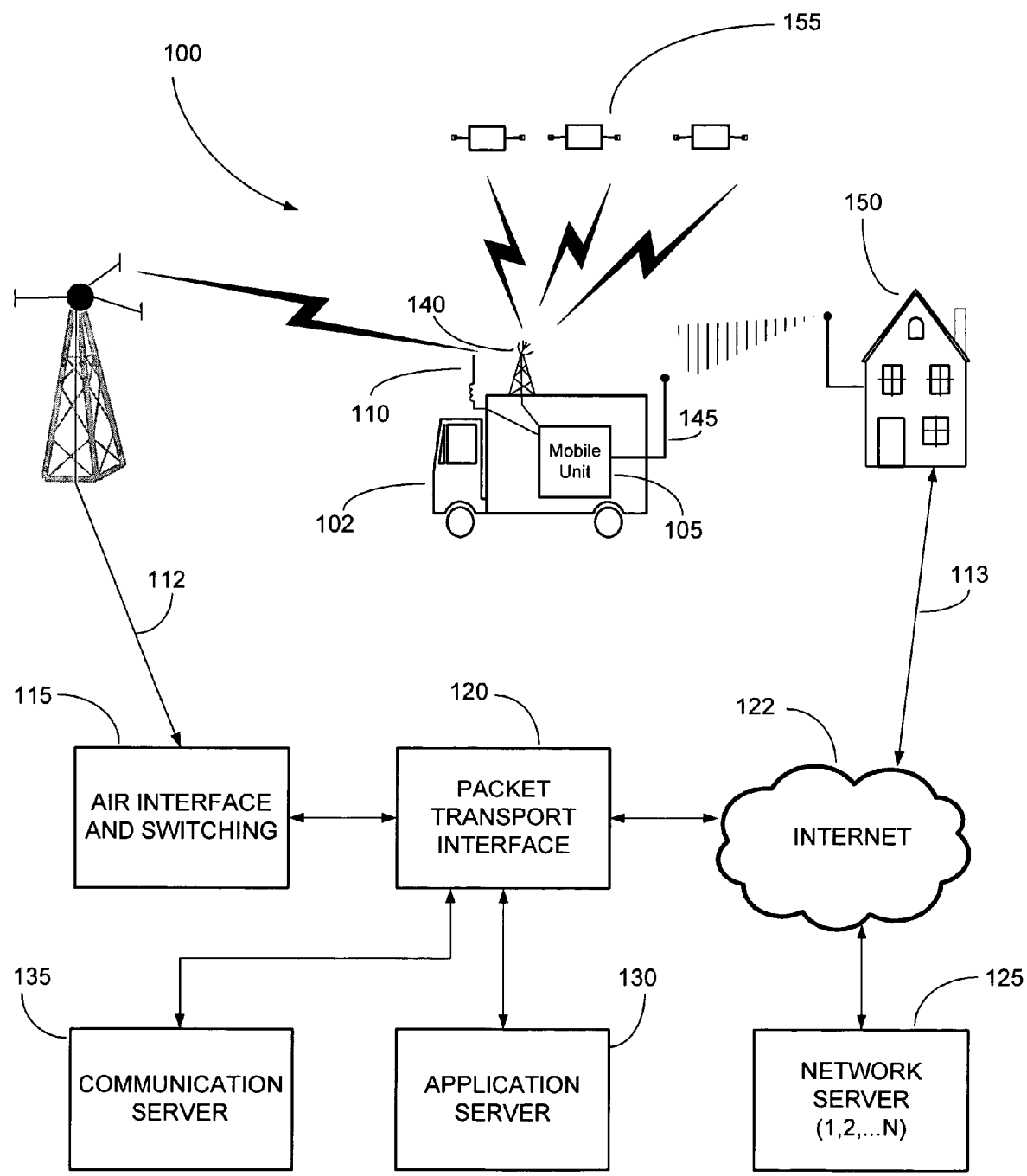
FIG. 1 is a block diagram representing an embodiment of a system involving a mobile unit with first and second network connections.

FIG. 1 is a block diagram representing an illustrative embodiment 100 of a system configuration used to support the present invention. A vehicle 102 includes a mobile unit 105. The architecture of the mobile unit 105 is discussed in more detail in connection with FIG. 2. FIG. 1 depicts one exemplary embodiment. As will be discussed, this figure is also representative of other embodiments. For example, the mobile unit 105 may be embodied within a hand-held cellular phone or wireless data device. The present invention may be used with dash-mounted vehicle computer/transponders or hand-held devices such as palm-pilots, personal digital assistants and laptop computers.

The mobile unit 105 is connected to a first antenna 110 which is used to maintain a first network connection 112. In one type of embodiment, the first network connection 112 is a wireless network connection to a wide coverage area cellular network such as a wideband CDMA network. The antenna 110 is operatively coupled to an air interface and switching module 115 via the first network connection 112. In many applications, the air interface and switching module 115 is provided by a telephone company which provides mobile communication services. The switching module handles air interface layer operations to include access and handoffs among cells supporting the network connection 112. In the illustrative embodiment 100, the air interface and switching module 115 is coupled via a communications interface to a packet transport interface 120. The packet transport interface 120 is operative to couple information between the air interface and switching module 115 and other networks and servers. The packet transport interface 120 is preferably coupled to a network such as the Internet 122. In some embodiments the packet transport interface 120 performs registration operations to log the mobile unit 105 in a mobility system such as mobile IP or SIP. In some embodiments, the packet transport interface 120 also performs layer 3 routing functions for packet rerouting within the vicinity of the mobile unit 105.

One or more network servers 125 are coupled to the Internet 122. It should be noted that in some embodiments the Internet 122 may represent a corporate intranet or a virtual private network overlaid upon the Internet. The one or more network servers 125 may be co-located with and directly coupled to the packet transport interface 120, or may be coupled across a network such as the Internet 122 as shown in the illustrative embodiment 100.

A communication server 135 may also be coupled to the packet transport interface 120 to manage connections for the mobile unit 105. The communication server 135 manages network and transport layer mobility and registration and monitors network level aspects of the connection between the mobile unit 105 and the air interface unit 115. Optionally coupled to the packet transport interface 120 is an application server 130. For example the application server 130 provides wireless data services to the mobile unit 105. The application server may implement the wireless application protocol (WAP) and may provide WAP gateway translation services as well.

The mobile unit 105 is also optionally coupled to a satellite antenna 140. This antenna, though depicted as a dish antenna, may be implemented with other types of antennas. The satellite antenna 140 may be used to receive satellite communications information. The satellite antenna 140 may also be used to receive GPS transmissions. In some systems, the satellite antenna 140 may be used to both receive and transmit satellite communications data and receive GPS transmissions. In some systems the satellite antenna 140 may be replaced or augmented with a local positioning system (LPS) antenna. A local positioning system can be implemented in various ways, but allows a mobile to be accurately located, for example, within a building.

The mobile unit 105 is also optionally coupled to a local area network antenna 145. The local area network antenna is coupled to communicate with a local wireless access point 150. A transmission from the local wireless access point 150 may emanate from a building, telephone pole, street light, store front, within a building or a particular floor or area within a building, and the like. In terms of cellular communications technology, the local wireless access point 150 is similar to a picocell level communication system or a wireless local area network. The local wireless access point 150 is preferably coupled to a network such as the Internet 122 via a gateway connection 113. The gateway connection 113 may involve a DS0, T1, DSL or cable modem backhaul link, for example. The gateway portion of the connection 113 may also include a router that handles localized mobility functions such as IP address translations in support of local handoffs to other locally controlled wireless access points similar to the wireless access point 150. In a preferred embodiment, the local area network of the wireless access point 150 is defined by the range of a low-power radio frequency channel. Depending on the system configuration, the range of the local area network may be, for example, as low as 10 feet to as high as a mile. In some embodiments, the low power radio channel is defined by a spread spectrum air interface such as the one used by cordless phones, wireless LAN technology, HomeRF, Bluetooth, toll-tag transponders, or other short-range technologies.

In this application, an "air-interface antenna" generically refers to any antenna used to maintain a network connection, receive satellite data, transmit local area network data, receive local area network data, or perform other related air-interface functions. It should be noted that while several air interface antennas are illustratively shown on the vehicle 102, the mobile unit 105 may use a single shared antenna structure to support multiple air interfaces. While some mobile units may include a plurality of distinct antennas, other embodiments may include a shared antenna capable of operating in several different frequency bands.

FIG. 1 shows only a local set of connections but, by induction, is representative of a larger network topology. In the illustrative embodiment, a cellular network providing wide-area coverage is depicted by the connection 112. A given network will typically include a plurality of macrocells and connections 112 using known cellular network topological methods. A local area connection is depicted by the local area wireless access point 150. It should be noted that within the coverage area of given base station in a macrocellular system, there may be an undermined number of local wireless access points 150. The number of local wireless access points may vary widely from macrocell to macrocell. Also, the communication protocol used by the different local wireless access points may vary from one access point 150 to another within a given macrocell coverage area. Also, a satellite communication system may be overlaid over the macrocellular and picocellular network topologies.

It should be noted that a given network associate provider may supply a plurality of wireless access points 150 comprising a subnetwork. The wireless access points in the subnetwork may themselves be arranged in a picocellular topology. Within this subnetwork, handoffs between one picocell and another are preferably handled locally. A router associated with the connection 113 preferably provides needed address translation and routing functions. When the mobile unit 105 leaves the subnetwork, another system level handoff (e.g., assisted by server 125) is needed. Hence the wireless access point may include its own picocellular level control mechanisms to control subnetwork level handoffs.

FIG. 1 is also representative of alternate embodiments. In a more general context, the mobile unit 105 uses a first air interface protocol to access a network using the first network connection 112. For example, this connection may be an open highway transponder used to communicate between a roadside fixed station and a vehicle. In this more general context, the local wireless access point corresponds to any other wireless protocol that is incompatible with the protocol used by first network connection 112. For example, the local wireless access point 150 may correspond to a lane-by-lane oriented toll tag protocol. In this example, as long as the vehicle can communicate with the open highway transponder, the present invention allows the mobile unit 105 to communicate with the local wireless access point 150, even if the mobile unit 105 is completely ignorant of the protocol used by the local wireless access point 150. In this example, different toll-tag systems across the country use different protocols, so the present invention allows a vehicle to roam between systems and access their services.

FIG. 1 serves as a background scenario to understand the context of the present invention, so the operation of the illustrative embodiment 100 is discussed in more detail in connection with FIGS. 2-5.

Figure 2:
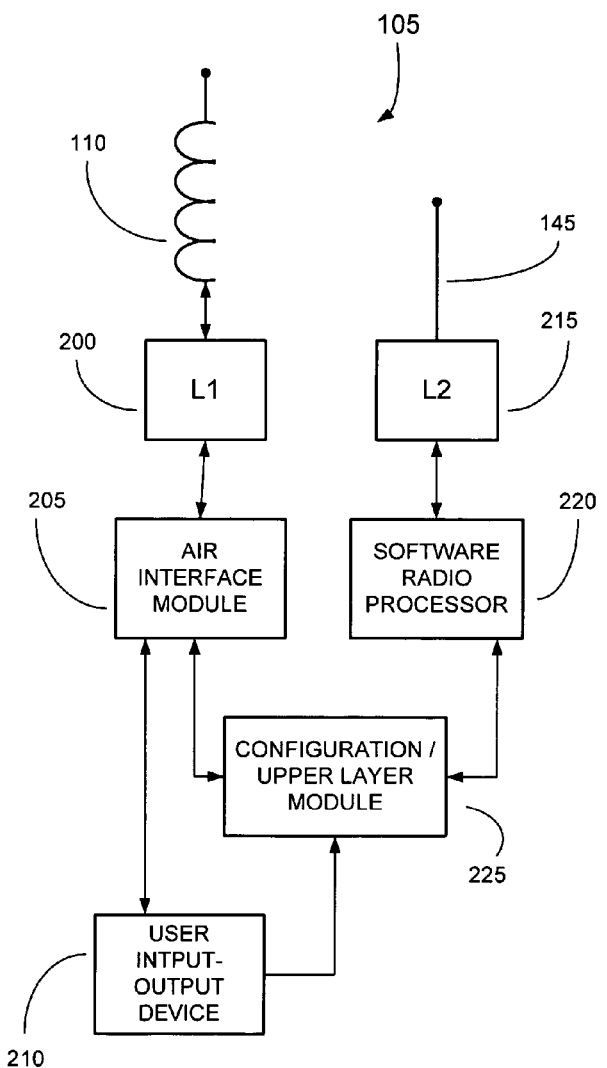
FIG. 2 is a block diagram illustrating an embodiment of a mobile unit designed in accordance with the present invention.

As illustrated in FIG. 2, the mobile unit 105 includes the network connection antenna 110 which is coupled to a first air interface front end 200. In some embodiments, the first air interface front end 200 is implemented as a cellular or PCS transceiver capable of transferring data traffic. The first air interface front end 200 provides a physical layer air interface to support the first network connection 112. The first air interface front end 200 may be implemented using dedicated circuits designed for a specific protocol or may use general radio frequency (RF) and data conversion circuits as used in software radio implementations.

The first air interface front end 200 is coupled to an air interface module 205 which preferably implements one or more layers within a protocol stack and is able to receive and transmit packet data. Protocol stacks are well known in the art, as is the construction of network interface equipment to implement a network connection. The air interface module 205 preferably supports a macrocellular air interface as implemented in CDPD, GSM, PCS or wideband CDMA. Such systems typically include packet and/or circuit switched services. In the highway applications, for example, the air interface module 205 may communicate using a standardized highway transponder protocol. Hence in general terms, the air interface module 205 communicates using a known protocol to provide wireless network access. The air interface module 205 may be implemented in customized circuitry or may be implemented using software radio processing as is discussed below.

The air interface module 205 is coupled a user input-output device 210. The user input-output device is commonly implemented as a display with a mouse and/or keyboard input. Some embodiments make use of other forms of input and/or output such as human speech. When human speech is used as an input, it is received via a microphone, digitized, and processed by a speech recognition circuit to produce a coded command signal representative of a user command. Some embodiments of the user interface 210 support voice and/or forms of multimedia communication.

The air interface module 205 is also coupled a configuration and upper layer communication module 225. The configuration and upper layer communication module 225 is discussed subsequently.

The local area network antenna 145 is coupled to a second air interface front end 215. The second air interface front end 215 provides an air interface to communicate data packets or other signals with the local wireless access point 150. The second air interface front end 215 preferably includes front-end radio frequency and data conversion circuits used to support software radio methods. The main requirement for the front end circuitry in the second air interface front end 215 is to support a variety of frequency bands and modulation formats to allow different air interface protocols to be implemented under the control of a software radio physical layer.

The second air interface front end 215 is coupled to a software radio processor 220. The software radio processor 220 is generally implemented with programmable digital signal processing hardware. For example, such hardware can be implemented using programmable digital signal processors, programmable logic, and/or devices containing a combination of a digital signal processor and peripheral components which themselves may be implemented with programmable logic. The software radio processor 220 is operative to implement a physical layer of a selected air interface communication protocol. In some systems the software radio processor 220 may also implement a link layer, a link sublayer, or other layers. In a preferred embodiment the software radio processor implements the physical layer. In another preferred embodiment the software radio processor implements the physical layer and a media access control (MAC) sublayer of the link layer.

The software radio processor 220 module is coupled to the configuration and upper layer communication module 225. The configuration and upper layer communication module 225 is preferably coupled to receive a software module from the air interface module 205. In a preferred embodiment the software module is an object that instantiates a class and invokes methods defined by one or more interfaces. As is discussed below, such a framework is used in accordance with the present invention to minimize software download requirements.

In some embodiments, the coupling of the software module from the air interface module 205 to the configuration and upper layer communication module 225 may be performed in response to signals received from the user interface device 210. In many embodiments the coupling of the software module to the configuration and upper layer communication module 225 is performed as a part of an automated handoff procedure. The configuration and upper layer communication module 225 is coupled to cause the loading of the software module into the software radio processor 220. This may involve bytecode compilation in embodiments involving Java or other virtual machines. The software module received from the first air interface is used to configure one or more lower layers of the second air interface. The operation of the mobile unit is discussed in greater detail in connection with FIGS. 3-4.

In embodiments involving a GPS receiver, the first air interface 110, 200, 205 may be considered to be a dual channel air interface having a GPS receiver with antenna 140 in addition to the first network connection (110, 112). In both cases, the first air interface is known (a communication and/or a positioning protocol, possibly a local positioning protocol) and the second air interface (145, 215, 220) is software configurable. Note that in some embodiments, the first network connection (110, 112) may also be implemented using a satellite network (140, 200, 205). In some systems the path 110, 200, 205 includes a dual channel path ((110,140), 200, 205) that overlays, for example a satellite network over the macrocellular network. Operation of systems employing GPS and/or LPS air interfaces are discussed in connection with FIGS. 3-5.

A physical processing circuit as used to implement the mobile unit 105 may be implemented in a variety of ways. The preferred way to implement the mobile unit 105 is using a bus-oriented processor architecture whereby a central processing unit is coupled to a memory via a bus. Likewise, the bus couples the central processing unit to peripheral devices such as the user input-output device 210 and air interface related circuits. In an exemplary embodiment, the first air interface includes a 3G W-CDMA air interface modem chip with programmable and special purpose circuits. The first air interface also includes a GPS receiver chip and is therefore a multipurpose air interface capable of cellular circuit switched communication, packet data communication, and geographical location. In the exemplary embodiment, the second air interface (145, 215, 220) is implemented with a digital signal processor, programmable logic and an RF front end capable of digitizing signals with a variety of bandwidths at a variety of center frequencies using known software radio front end methods. The software radio processor is preferably implemented using high speed digital signal processing circuits coupled to programmable logic circuits and is able to implement a variety of physical and possibly link layer protocol layers.

The configuration and upper layer communication module 225 is preferably implemented as a software module that runs on the general-purpose processor discussed above. The configuration aspect of the module 220 is operative to receive a software module from the first air interface (110, 200, 205) and use it to configure the second air interface (145, 215, 220). As will be subsequently discussed, the configuration and upper communication layer module 225 also implements upper layers of at least one protocol stack and provides a consistent interface to user applications 210. As will be discussed, in some embodiments the configuration and upper layer communication module 225 uses a resource description to identify a set of needed lower layer software submodules, causes only the needed software submodules to be loaded, and builds the lower layer software therefrom. In some cases this involves the compilation of bytecodes from a virtual machine to a specific DSP implementation.

It should be noted that the hardware architecture of the mobile unit 105 may be modified to an all-software radio structure. Some or all of the merging of hardware components discussed below can be used to reduce the replication of hardware in the system. For example, the antennas 110 and 145 are merged into a single multi-mode antenna that handles the antenna function for both the first and second air interfaces. This implies a broadband or at least a multi-band antenna. The first and second air interface front ends 205, 215 may also be merged. In such a system, the front end 215 also provides the front end for the first air interface. Likewise, the software radio processor 220 may be programmed to implement the first air interface. In this case the mobile unit 105 maintains the basic architecture as depicted in FIG. 1, but in a time-multiplexed fashion. When the hardware components are merged as described above the system typically process only one air interface at a time. Multitasking may be used in embodiments having enough software radio processing power to provide the appearance of two simultaneously available air interfaces.

In another embodiment the antennas 110 and 145 are merged, and the front ends 200, 215 are merged, but the air interface module 205 and the software radio processor 220 remain separate so that both air interfaces may be maintained concurrently with some reduction in hardware. In any of the embodiments discussed above, the air interface module 205 may be implemented in software radio hardware as opposed to customized circuits.

In operation, the mobile unit 105 is operative to maintain the first network connection 112 via the network connection antenna 110 (or 140 in some embodiments). The mobile unit 105 preferably moves about in a geographic region, for example carried by the vehicle 102 moving about in a city. As the mobile unit 105 enters the vicinity of the local area wireless access point 150, a radio frequency signal is coupled onto the local area network antenna 145. In some systems, local area network antenna 145 is used in a scanning mode to find the local area wireless access point 150. In other embodiments the communication server 135 keeps track of the mobile unit 105's position and initiates a hand-off to the local wireless access point. In other embodiments, the mobile unit reports its positional information to the remote network server 125 via the first air interface connection 112, and the network server sends signals to the mobile unit 105 and the local area wireless access point 150 to cause the mobile unit and the local area wireless access point to initiate communication therebetween.

Note that the current system allows the mobile unit 105 to be connected through a transport layer connection to a remote server (e.g., 125, 130, 135). The transport layer connection is used to establish a management session with a remote server. The remote server can then manage roaming operations between networks on behalf of the client. Prior art cellular and PCS based solutions use a link layer of an air interface to control handoffs. By placing the handoff mechanism at the transport layer or above, a remote server can control roaming for a client whereby the remote server is independent of any given wireless access system. This allows the server to optimize the access of a client over a wide variety of access providers. Prior art solutions such as mobile IP and SIP work at the upper layers, but do not address the federated access problem addressed herein. Mobile IP and SIP server based methods can be augmented by the various aspects of the present invention. The details of the operation of the mobile unit 105 in a client-server configuration are discussed further detail in connection with FIGS. 3-5.

Figure 3:
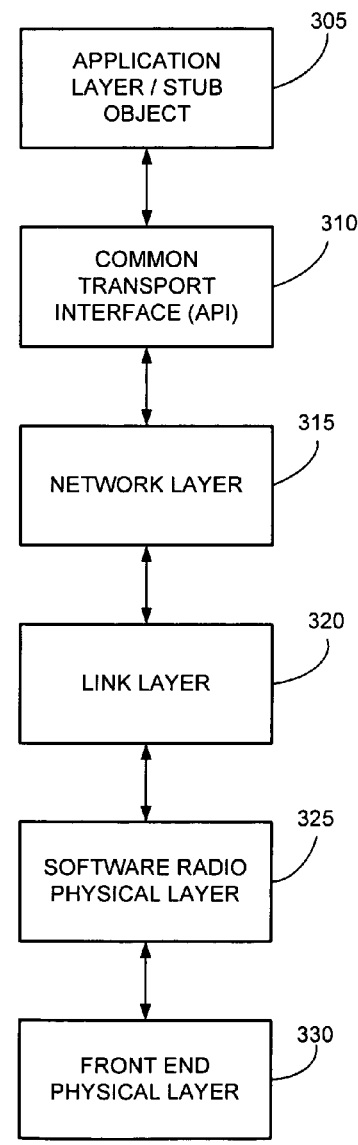
FIG. 3 is a block diagram illustrating an implementation of a protocol stack and preferred software architecture of the present invention.

Referring now to FIG. 3, a protocol stack is illustrated in block diagram form. At the upper layer is the application layer 305. An application layer exists in the mobile unit 105 and communicates with a peer application layer in one or more of the servers 125, 130, 135. The application layer preferably comprises a stub object as is discussed hereinbelow. The application layer 305 invokes a common transport interface 310 to support communication with lower layers. Preferably the common transport interface 310 is implemented as an interface defined over a class of objects in an object oriented programming language such as Java™.

The common transport interface 310 is invoked by the application layer program to open a transport connection such as a socket with a remote server, e.g., 125, 130, or 135. In a preferred embodiment a TCP/IP stream socket is opened using a socket-based API. Also, preferably the application layer involves a client-side stub object (proxy) that communicates with a peer server-side remote object in the server (125, 130, or 135) using RMI, CORBA, or a related distributed object interface. The common transport interface 310 converts the method invocations supported by the interface into transport layer actions to support a transport layer connection with a peer transport layer in a server 125, 130, or 135. Note that multiple transport connections can be opened to more than one server, or a multicast transport connection can be opened to more than once server at once.

The transport layer implemented by the common transport interface 310 invokes methods supplied by a network layer 315. The network layer, as is known in the art, provides network routing related functions in support of the transport socket. The network layer communicates with transport layer by calling transport methods advertised to the network layer by the transport layer. The network layer also communicates with a link layer 320.

The link layer 320 implements the link layer of an air interface. The link layer 320 is typically implemented as a portion of a software radio protocol. That is, the link layer interface is software programmable. As will be discussed, in accordance with the present invention, the software program to implement the link layer interface of the second air interface (145, 215, 220) is received over the first air interface (110, 200, 205). This software module is preferably loaded into the software radio processor 220 by the configuration and upper layer module 225. In some embodiments, the received link layer software module is considered to be an upper layer and is executed by the configuration and upper layer module 225. The "upper layer" portion of the configuration and upper layer module 225 performs protocol processing for the layers 310, 315, and optionally 320. In some embodiments this same processor executes code for the application layer 305.

The link layer 320 communicates with a peer link layer in a wireless access point. To do so, the link layer 320 passes data to and from a software radio physical layer 325. The software radio physical layer implements the physical layer of the second air interface protocol. This involves mainly modulation, coding and channel equalization related processing. The output of the software radio physical layer is sent to a front-end physical layer 330. The front-end physical layer corresponds to the circuits in the second air interface front end 215. This layer is responsible for converting the software radio digital output signal into an analog RF signal for transmission to the local wireless access point 150. The front end physical layer is also operative to provide a digitized sample stream based upon the analog signal received by the air interface antenna 145.

As will be discussed subsequently, a given transport connection may be serviced by one or more sets of lower layers. For example, the application layer in the mobile unit 105 may establish a transport connection with a peer application layer in the server 125. When the mobile roams to a locality including the local wireless access point 150, a new set of lower layers (e.g., 320, 325 and possibly configuration data for layer 330) are downloaded from the server 125 to the client. The client then resumes the transport connection using the newly loaded set of software layers. The common transport interface layer is used to ensure that the transition from a first lower layer protocol to a second lower layer protocol is transparent to the application layer.

In accordance with an aspect of the present invention, the lower layers (320 and/or 325) of the protocol stack are composed of a set of submodules made up of objects having interfaces. Each object implements a software module with a known interface. Certain modules are reusable due to similarities between certain different protocols. For example, the HiperLAN, HomeRF and Bluetooth protocols all share certain common features due to their frequency hopping based protocols. In fact, it is common for certain standardized protocols to adopt a sublayer or submodule that is defined in another protocol. Hence in accordance with an aspect of the present invention, the lower layers are designed using a set of objects having predefined API's. In one exemplary embodiment, objects implementing these API's are posted on a web site having a known URL. A resource description framework (e.g., RDF) language is used to define the structure of a lower layer (e.g. 320 and/or 325). The RDF file can be read by the client or a server and compared to a list of objects presently stored in the mobile unit 105's memory (within 225 or 220). Using this approach, client need only download the set of submodules needed at that time by the mobile unit 105 to implement the lower layers as specified by the RDF. The RDF file describes a dependence tree of needed modules to implement the lower layer 320 and./or 325. Once all the modules specified by the RDF file are loaded, the object representing the lower layer will have available to it all of the methods needed to implement the interfaces to perform lower layer processing. Using this approach, the time required to download a lower layer software module can be greatly reduced.

Figure 4:
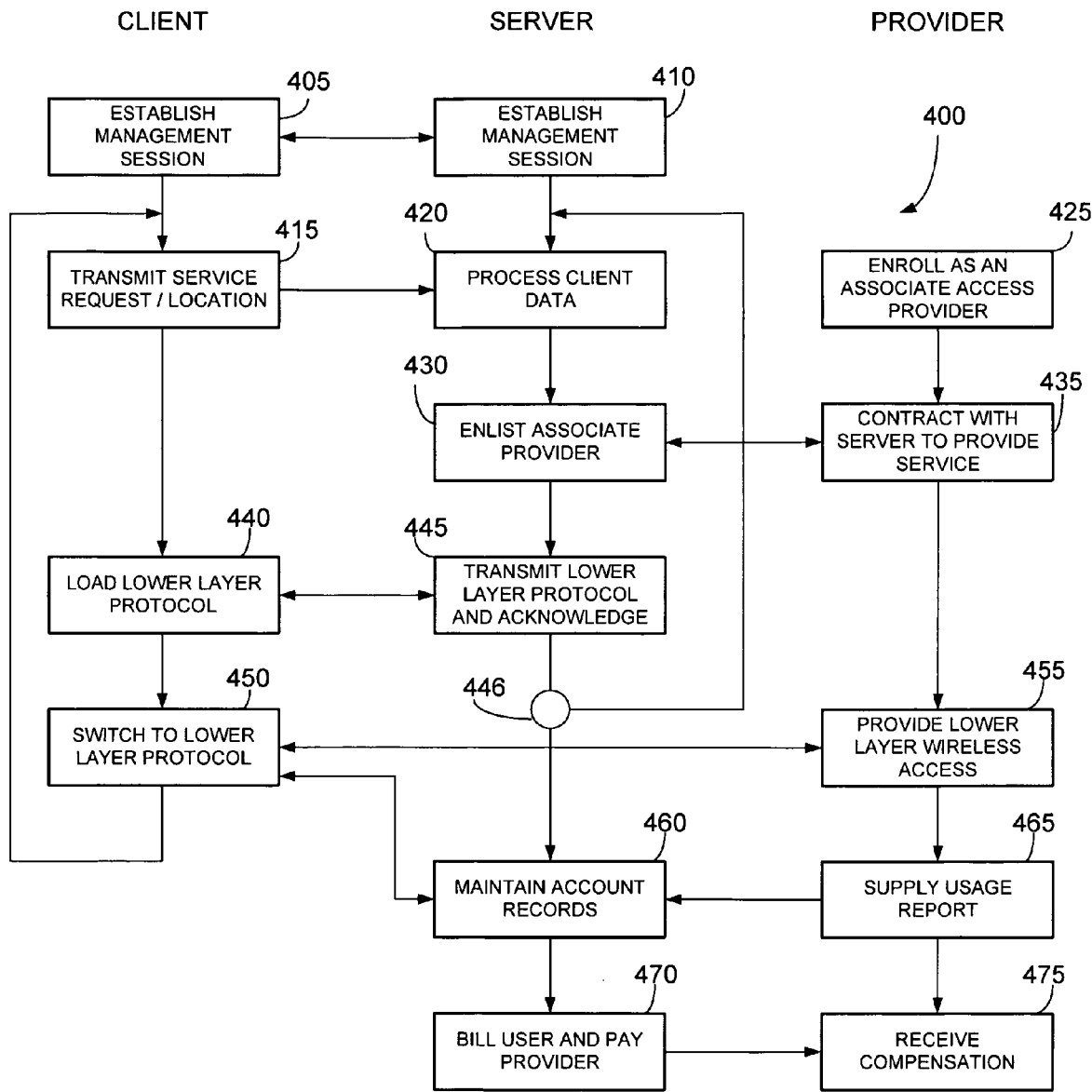
FIG. 4 is a flow chart illustrating an exemplary client-server-provider interaction to configure a client to initiate communication with a wireless access point.

Referring now to FIG. 4, a method 400 of client-server-provider communication in accordance with the present invention is illustrated as a multithreaded flow chart. The flow chart of FIG. 4 illustrates methods practiced individually by a client, a server and a provider. FIG. 4 also describes aspects of the operation of the system 100 and the mobile unit 105. Similarly, FIG. 4 is illustrative of a method of selling services by a merchant web site that sells wireless access services from a federation of associated access providers. FIG. 4 also illustrates a method of selling wireless access services by a wireless access provider associate. FIG. 4 also illustrates a method to augment a wireless system such as a macrocellular system with additional capacity by enlisting additional bandwidth provided by associates.

In a first step 405 a mobile client such as the mobile unit 105 establishes a management session with a server (e.g., 125). The management session may be established at the transport layer or above. The management session is preferably established at the session layer of the OSI model or at the application layer 305. The management session is initially supported by a first air interface such as the air interface connection 112. The management session is established with a network server such as the network server 125. In some embodiments the server may correspond to the communication server 135 or the application server 130. For example, the management session is used to log in with a server such as a mobile IP server or a SIP (session initiation protocol) server. For the purpose of discussion only and without limitation, it will be assumed that the server of FIG. 4 is a network server 125 and the network server uses the SIP protocol to establish sessions on behalf of the mobile unit 105. As will be discussed, the management session is used to supply the mobile unit with an air interface connection to the wireless access point 150. Once this lower layer connection is established, the client (105) can access the Internet 122 using this connection. The optional mobile IP and SIP services are used to provide the mobile unit 105 with a temporary IP address while connected to the wireless access point 150. Other hierarchical mobile IP addressing and routing schemes may also be used to support the upper layers once the air interface connection (145, 150, 113) is established.

In a step 410 the server establishes a server-side management session with the client. Once the management session is established between the client and the server, the server works on behalf of the client to ensure the client is provided with optimized wireless access connectivity. The optimization is supplied according to user preferences. For example, some users seek to minimize costs, while others may be more sensitive to reliability and connection speed. Users may also request different optimization strategies at different times for various reasons.

Once the management session is established between the client and the server, in a step 415 the client transmits a set of information to the server. This information may include a service request and/or a location. The service request for example may be for a high-speed wireless link of 128 kbps-peak speed at as low of a cost as possible. The location information may be conveyed, for example, as a set of GPS coordinates. GPS and/or LPS coordinates may be sent to the server in an aspect of the present invention in order to help the server to select a wireless access point 150 to service the client 105.

In some embodiments the step 415 also involves interacting with a local wireless access point. In such embodiments, a common access channel or a set of access channels is scanned by the wireless access point 150 and/or the mobile unit 105. For example, the mobile unit 105 sends codes out on a plurality of access channels. If a wireless access point receives the code, it can either send an acknowledgement to the mobile unit 105, send a report message to the server 125, or both. Like wise the wireless access point may broadcast on an access channel and the mobile unit may scan a set of access channels. In this case the mobile sends an acknowledgement message to the wireless access point and/or sends a report message to the server 125. In other embodiments, no access channels are used, but the server 125 determines a wireless access point 150 based on GPS or LPS data reported by the mobile unit 105.

In accordance with another aspect of the present invention, the step 415 can be carried out in an alternative way. For example, suppose a client in the U.S. is getting ready to travel to France. When the client device arrives at its destination, the first air interface 110, 200, 205 may not be operational. In such a case the method 400 may be split over time. The user enters a destination into the user input-output device 210 or to a computer that communicates with the mobile device using, for example, an RS-232 connection or a Bluetooth connection. The destination (e.g., Paris) is transmitted to the central server 125 in the step 415 and the method steps 445 and 440 as discussed below are allowed to proceed early. Note that only specific submodules may be need to be altered to make the protocol used in the U.S. compatible with the protocol used in France, and only those submodules need be loaded if a resource description framework description is used to specify the lower layer interface in accordance with an aspect of the present invention. Another way to address the problem of roaming when the first air interface is not available is to use a satellite overlay, 140, 200, 205. The satellite connection to the first air interface to supply the needed air interface protocol information to the client device.

In a step 420 the server processes the user's service request information and selects an access provider to supply the service. For example, a local area network may be available by the local wireless access point 150. The server may take various issues into account when selecting a provider. Preferably the server maintains a profile record of the client's device. It may be known to the server that certain client devices are more adept at implementing certain protocols than others, and the client's optimization criterion parameters are also preferably taken into account. The server also preferably maintains a record of the lower sublayers loaded into the mobile unit 105 at that time. In some embodiments the client transmits a list of loaded modules to the server. The server then identifies the lower layer submodules that need to be pushed to or downloaded by the client. In some embodiments, the server identifies the required lower layer protocol to the client, and then the client optionally downloads the needed sublayer modules from the same server or a different server after performing optional RDF processing to streamline the download process. All such embodiments are within the scope of the present invention.

The step 420 processes the client's information to select a local service provider to service the client with a wireless access point. Once the wireless access point 150 is selected, the server enlists the wireless access point 150 to provide the service (430). In a preferred embodiment, a remote associate enrolls the availability of the wireless access point 150 with the server 125 in a step 425. As is discussed in connection with FIG. 5, this is preferably performed electronically using an on-line registration process. Once the associate is enrolled as a provider, it can contract to provide services to the client on behalf of the server 125. In a step 435, the associate, i.e., the wireless access provider who operates the wireless access point 150 contracts with the server to provide the access.

It should be noted that the associates in the federation may include smaller providers and larger providers. A smaller provider might be the owner of a home on a beach. This homeowner sets up an IEEE 802.11 wireless LAN to provide access to sunbathers. Another example might be the owner of a mall or an airport. A large associate might be a cellular operator in another service area. In the example above, a client from the U.S. travels to France and the associate in that case is cellular operator using a European standard as opposed to a U.S. standard. In prior art systems, roaming charges are agreed upon between cellular operators and users suffer accordingly. According to an aspect of the present invention, roaming is contracted by the central server 125. The central server 125 is an independent agent who acts on behalf of the client to secure an optimized service. For example, each associate may post a required fee for services, and depending on an individual user's usage profile, the server 125 may select the most economical wireless access solution. In one embodiment, each associate posts a service profile and a fee schedule and the central server then selects the associate who best meets the client's needs. This embodiment provides a bidding marketplace whereby the central server shops for wireless access on behalf of the client.

Once the wireless access provider 150 has indicated the availability of the resource in the step 435, the server transmits a lower layer protocol identification message to the client in a step 445. This message may involve pushing a lower layer software module to the client. In another embodiment, the server maintains a list of submodules already loaded in the client and uses an RDF or related description of the lower layer to identify those submodules that need to be loaded into the client to implement the lower layer of the contracted provider. In other embodiments the message sent by the server in the step 445 identifies the needed layer and the client downloads the needed software modules from the same or another server, preferably using RDF or a similar description framework to streamline the downloading process. In a step 440, the client loads the needed lower-layer modules, either by downloading or by receiving a push.

In the step 440, the client loads the modules and then sends an acknowledgement message back to the server. If the loading process is successful and the new lower layer is operational, the server will receive the acknowledgement message. The acknowledgement message is preferably sent using the same upper-layer management session as was used in the steps 405, 410. In some embodiments a separate session may be used for acknowledgement messages. If the acknowledgement fails, communication is resumed using the first air interface and the process can be repeated to find another secondary air interface provider.

When the acknowledgement is successful, the server preferably sends back a second acknowledgement to the client to let it know the new air interface is operational. At that time the client transitions to a step 450 where it switches over the lower layers of the protocol stack to the new protocol. Prior to this the new air interface was used to establish the new connection, but at the step 450, the upper layers of the protocol stack to include application layer processing now takes place over the newly installed lower layers. It can be noted that a given client may maintain different sessions (e.g., some for applications and some for communication link management) that use different air interfaces. In such systems, the software radio must be able to load two air interfaces at once or at least time-division multiplex between two air interfaces.

In the step 450 the client switches to the new air interface using the link and physical layer connections to the wireless access provider 150. The wireless access provider 150 maintains communication connectivity with the client in a step 455. In an optional step 465, the wireless service provider submits a usage report to the server. In an optional step 460, the server maintains an account record for the user based on the usage. In other embodiments no usage report is sent, but the user (client) is charged a fee for the connection. In still other embodiments, the user pays a flat rate such as a monthly rate and the user is not directly charged for the specific connection to a given wireless access point 150. Generally, however, the server maintains an account record for the client and/or the provider. In a step 470 the server collects funds from the client and distributes some of these funds to the associate/provider. The provider then receives compensation in the step 475.

In accordance with a preferred embodiment of the present invention, the client also submits a quality report to the server. This is shown by the double arrow between the step 450 and the step 460. If the connection quality supplied by the wireless access point 150 does not meet a quality of service requirement, the connection may need to be terminated early. By having the clients report quality factors (e.g., number of link layer frames in error), the server 125 may maintain a record on the quality and reliability of the connection supplied by the associate or a specific wireless access point 150. This quality feedback can also be used to provide real-time feedback to be used in the associate-selection process of the step 420. Certain associates may provide good service until an overload condition is met, and the server will not want to assign any new users to that associate at that time. The server preferably maintains a record of the quality of the wireless access point 150's service and uses this indication to grade the associate. A user seeking to minimize costs might be switched to a "grade B" access point while a user who specifies a quality of service based optimization parameter may only use "grade A" associates. That is, the quality ratings of the federated wireless access points are preferably used to optimize the selection process of the step 420. In another aspect of the present invention, the amount of compensation provided in the step 470 for a wireless access point 150 may be influenced by the quality ratings supplied by client users.

In accordance with another aspect of the present invention, the central server also uses the step 460 to manage the wireless access point by providing it with feedback and coordination data to improve its quality rating. To do this the server 125 maintains a geographical digital map identifying the locations of one or more associated wireless access points. The server 125 then evaluates potential interference between associated wireless access points. If two wireless access points produce co-interference, the server attempts to resolve this by sending down, for example, orthogonal hopping sequences to the two stations. In accordance with another aspect of the present invention, non-associated wireless access points 150 may also use this service. For example, suppose a non-associated wireless access point is having interference problems. The provider of the non-associated wireless access point may log into an on-line form to register with the central server 125. For example the non-associated wireless access point's air interface parameters and its location are entered into a web page form. Now the server 125. evaluates co-interference and attempts to orthogonalize both associated and non-associated access points. The server preferably keeps registered non-associates in the database and subsequently updates systems as needed, for example as new wireless access points are added. This aspect of the present invention provides a central server means for reducing co-channel interference among a loose federation of associated and non-associated wireless access points. Orthogonalizations can involve assignment of frequency bands, direct sequence spread codes, frequency hopping sequences, time slot usage and/or synchronization sources.

Figure 5:
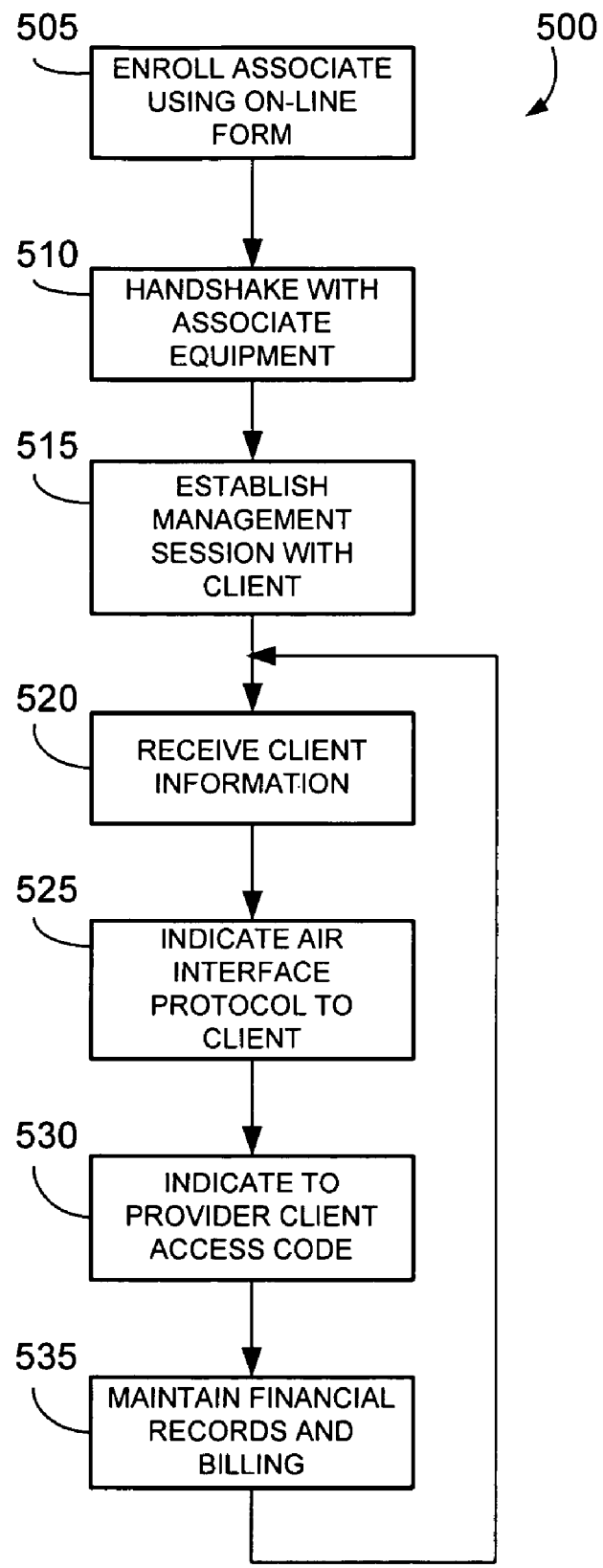
FIG. 5 is a flow chart illustrating a method of selling federated wireless access services in a multi-protocol environment.

Referring now to FIG. 5, a method of selling wireless access services by a federated set of associates through a merchant web site is illustrated in flow chart form. This method of selling may also be used, for example, by a communication services provider to augment a cellular or PCS system with associate picocell sites to increase system capacity. For example, it may be desirable to offload cellular data or telephony traffic emanating from a busy area like an airport or mall onto a local area network. The cellular operator may wish to contract with third parties to offload traffic, for example when the system capacity has otherwise met its limit.

In a first step 505 an associate is enrolled into a federation of wireless access providers. In accordance with an aspect of the present invention, this is preferably done using an on-line registration form. Other methods of enrolling are also possible, such as by phone, mail or other means. A plurality of associates preferably register to provide wireless access services on behalf of a merchant web site that provides wireless access services, or on behalf of a communications system operator as described above. In general, the associates register with a central server entity (e.g., 125, 130, or 135).

In a second step 510 a network transaction is made between the central server entity and the newly enrolled associate. The step 510 may also be performed prior to completion of the enrollment process to ensure a level of quality control. In the step 510, the central server entity performs network handshake transactions with the equipment supplied by the associate. This handshaking procedure allows an associate to purchase a system, set it up, plug it into a back-haul network connection (e.g., DSL or a cable modem wireline connection) and then have the system enter an autoconfigure mode. In the autoconfigure mode the associate's wireless access system 150 handshakes with the central server (e.g. 125) to make the resource 150 and its air interface known to the central network server. By the end of the enrollment and handshake steps, the associate's system is ready to carry traffic. The traffic may involve data, voice, video, or in general any combination of multimedia signals.

In a step 515 a client such as the mobile unit 105 establishes a management session with the central server such as the server 125. The management session was discussed in connection with FIG. 4. The management session provides a virtual link for the client and server to communicate so that the server may allow the client to access the wireless access point 150 supplied by the associate.

In a step 520 user information is sent to the central server, preferably via the management session link. The user information informs the central server of the architecture, limitations, present configuration, and/or location (e.g., using GPS or LPS) of the mobile unit 105. In embodiments where the central server corresponds to the communication server 130, the location of the client may be known due to handoff related information maintained by the server 130. However, if the central server corresponds to the network server 125, the central server 125 may not know the client's location unless indicated by the client. In this type of embodiment the central server 125 wishes to move the mobile unit to an air interface operated by an associate to provide either lower cost service or an increased data rate to the client. In still other embodiments the location information maintained in the communication server 130 may be passed to the central server 125. This may occur, for example if the central server is able to present an authorization code to the communication server 130. In still other embodiments the mobile unit 105 and the wireless access point 150 may identify one another through access channel scanning interactions as described above.

In a step 525 an air interface protocol for use with the wireless access point 150 is indicated by the central server to the client. This operation may involve a simple protocol number whereby the client then selects an appropriate air interface in a multi-mode device. In accordance with an aspect of the present invention, some embodiments involve sending to the user a software module implementing a lower layer of an air interface protocol for use by a software radio. The software module is preferably written in the Java language (or some other virtual-machine bytecode language) so that it is portable. The software module is preferably also described by a resource description framework (RDF) type language to define a set of sublayer resources needed to implement one or more lower layers of the air interface used by the wireless access point 150. The client (mobile unit 105) then preferably downloads or is pushed only those modules needed to implement the air interface. As much software module reuse as possible is used by having certain modules be reused by more than one protocol.

Also, when the configuration module 225 includes a just-in-time compiler, it may be preferable to keep the reusable modules in compiled form.

Another aspect of the step 525 is the optional substep of performing just-in-time compiling in the central server (e.g., 125) on behalf of the client (e.g., 105). The central server may maintain a table of architectures, and if the architecture of the mobile unit 105 is known, the central server may make accessible a precompiled set of software modules or sub-modules to the client. The server may also decide whether it is preferable to send the bytecodes themselves or the precompiled bytecodes on a selective basis. The selectivity may involve a user parameter that indicates battery optimization parameters and bandwidth constraints. For example, it takes client battery power to compile the bytecodes in the client. Also the size of the precompiled code versus the raw bytecodes needs to be evaluated. If the precompiled code is smaller it is preferable to send the precompiled bytecodes on a point to point link. If the link is point to multipoint, it is better to send the bytecodes. If battery consumption is a key factor, the server may elect to precompile the bytecodes.

In a step 530 a message is optionally sent to the access provider. This message includes a client authorization code that lets the access point 150 know the client has been authorized by the central server to use the service provided by the access point. In a step 535, the central server maintains financial and billing information on behalf of the associate. Based on the contract between the central server and the associate, the associate will receive compensation for providing access to clients. For example, the associate may be paid a flat monthly rate, may be paid based on the number of client sessions established over a given period of time, or may be paid based on the number of packets that transit to and/or from clients authorized to use the wireless access point 150 by the central server 125. Other payment plans are possible, but these methods are deemed to be preferred at this time.

Although the present invention has been described with reference to specific embodiments, other embodiments may occur to those skilled in the art without deviating from the intended scope. For example, certain ones of the steps of the methods or blocks of the apparatus or systems may be omitted. For example, the methods 400 and 500 may be used to set up a federated system of associates that all use a fixed and specific set of protocols for the second air interface (145, 215, 220). For example, a given associate may implement IEEE 802.11, HomeRF, and/or Bluetooth and the mobile unit 105 may be hardwired to support one or more of these protocols. In such embodiments, for example, the steps related to downloading lower layers to a software radio could be omitted. Therefore, it is to be understood that the invention herein encompasses all such embodiments that do not depart from the spirit and scope of the invention as defined in the appended claims.

What is claimed is:

1. For use in a system comprising at least a first wireless access point that uses a first air interface protocol and a second wireless access point that uses a second air interface protocol, wherein the first and second wireless access points are both coupled to an Internet, at least one member of the group consisting of the mobile unit, the first wireless access point and the second wireless access point communicates via the Internet at a transport layer or above with a roam management server system to facilitate a system-level hand-off operation from the first wireless access point to the second wireless access point, and the mobile unit couples to the Internet using a first connection via the first wireless access point prior to the system-level handoff operation, a method comprising:

receiving at the roam management server system an indication of an event that identifies the second wireless access point as a potential point of attachment for the mobile unit;

determining whether a second connection between the mobile unit and the second wireless access point is preferable to the first connection, wherein the determining is performed by the roam management server system in accordance with an optimization strategy; and sending from the roam management server system to the mobile unit an indication to switch from the first connection to the second connection in the event that the roam management server system determines that the second connection is preferable.

2. The method of claim 1, wherein the system-level handoff operation further comprises:

evaluating whether the mobile unit is lacking one or more communication capabilities of the second wireless access point; and if the evaluating indicates that the mobile unit is lacking the one or more communication capabilities with the second wireless access point, sending to the mobile unit via the Internet one or more executable software modules to be loaded into the mobile unit and to be used to reconfigure the mobile unit to have the one or more communication capabilities indicated to be lacking.

3. The method of claim 2, wherein:

the evaluating is performed by a server function coupled to the Internet and affiliated with the roam management server system;

the server function evaluates at least a portion of a resource description language description to determine that the one or more executable software modules are not resident in the mobile unit and are needed to provide the mobile unit with the one or more communication capabilities indicated to be lacking; and the resource description language description is used to describe a set of software resources resident in the mobile unit that implement at least a portion of a protocol stack located in the mobile unit.

4. The method of claim 2, further comprising:

the mobile unit receiving the one or more executable software modules via the first connection;

the mobile unit reconfiguring a software layer of a protocol stack located in the mobile unit;

the mobile unit switching one or more first software layers out of the protocol stack, and switching one or more second software layers into the protocol stack, wherein the one or more second software layers include the reconfigured software layer; and the mobile unit coupling to the Internet using the second connection after the system-level handoff operation;

wherein the second connection makes use of the protocol stack after the reconfiguring and switching.

5. The method of claim 1, wherein:

the first air interface protocol is a terrestrial cellular communications air interface protocol, the second air interface protocol is a wireless local area network air interface protocol, the first wireless access point is a part of a terrestrial cellular communications network and the second wireless access point is a part of a wireless local area network; and the second wireless access point uses a low power radio transceiver that has a local coverage area less than one quarter mile, and the first wireless access point has a wide coverage area substantially larger than the local coverage area.

6. The method of claim 1, wherein the roam management server system does not include any remote server component functions on either of the first wireless access point and the second wireless access point.

7. The method of claim 1, wherein the sending is performed at the transport layer or above.

8. The method of claim 1, wherein:

the first air interface protocol is a wireless local area network air interface protocol, the second air interface protocol is a terrestrial cellular communications air interface protocol, the first wireless access point is a part of a wireless local area network, and the second wireless access point is a part of a terrestrial cellular communications network that supports both Internet connectivity and circuit-switched cellular voice channels; and the first wireless access point uses a low power radio transceiver that has a local coverage area less than one quarter mile, and the second wireless access point has a wide coverage area substantially larger than the local coverage area.

9. The method of claim 8, wherein the first connection wirelessly carries a sequence of packet-switched voice-over-Internet (VoIP) packets, the second connection wirelessly carries a circuit-switched voice data stream, and the mobile unit implements an upper layer VoIP audio function while connected to the Internet via the first connection and a circuit-switched audio function while being provided circuit-switched cellular voice connectivity by the second connection.

10. The method of claim 1, wherein the Internet is a member of the group consisting of a corporate intranet and the global ubiquitous Internet.

11. For use in a system comprising at least a first wireless access point that uses a first air interface protocol and a second wireless access point that uses a second air interface protocol, wherein the first and second wireless access points are coupled to at least respective members of the group consisting of an Internet and a terrestrial cellular communications network, at least one member of the group consisting of the mobile unit, the first wireless access point and the second wireless access point communicates via the Internet at a transport layer or above with a remote server system to facilitate a system-level handoff operation from the first wireless access point to the second wireless access point, and the mobile unit couples to a remote telephony endpoint via a first connection between the mobile unit and the first wireless access point prior to the system-level handoff operation, a method comprising:

receiving at the remote server system an indication of an event tat identifies the second wireless access point as a potential point of attachment for the mobile unit;

determining whether a second connection between the mobile unit and the second wireless access point is preferable to the first connection, wherein the determining is performed by the remote server system in accordance with an optimization strategy; and sending from the remote server system at the transport layer or above an indication for the mobile unit to perform the inter-system handoff operation from the first connection to the second connection in the event that the remote server system determines that the second connection is preferable.

12. The method of claim 11, wherein:
the first air interface protocol is a wireless local area network air interface protocol, the second air interface protocol is a terrestrial cellular communications air interface protocol that supports circuit-switched cellular voice channels, the first wireless access point is a part of a wireless local area network, and the second wireless access point is a part of the terrestrial cellular communications network, and the first wireless access point uses a low power radio transceiver that has a local coverage area less than one quarter mile, and the second wireless access point has a wide coverage area substantially larger than the local coverage area.

13. The method of claim 12, wherein the first connection wirelessly carries a sequence of packet-switched voice-over-Internet (VoIP) packets, the second connection wirelessly carries a circuit-switched voice data stream, and the mobile unit implements an upper layer VoIP audio processing function while connected to the remote telephony endpoint via the first connection and a circuit-switched audio processing function while being provided circuit-switched cellular voice connectivity by the second connection.

14. The method of claim 13, further comprising:
the mobile unit switching from the first connection to the second connection while substantially maintaining voice connectivity of a voice call with the remote telephony endpoint, to thereby provide a seamless call handoff of the voice call from the wireless local area network to the cellular network.

15. The method of claim 11, wherein:
the first air interface protocol is a terrestrial cellular communications air interface protocol that supports circuit-switched cellular voice channels, the second air interface protocol is a wireless local area network air interface protocol, the first wireless access point is a part of the terrestrial cellular communications network, and the second wireless access point is a part of a wireless local area network; and
the second wireless access point uses a low power radio transceiver that has a local coverage area less than one quarter mile, and the first wireless access point has a wide coverage area substantially larger than the local coverage area.

16. The method of claim 15, wherein the first connection wirelessly carries a circuit-switched voice data stream to communicate with the remote telephony endpoint, the second connection wirelessly carries a sequence of packet-switched voice-over-Internet (VoIP) packets, and the mobile unit implements an upper layer circuit-switched audio function while being provided circuit-switched cellular voice connectivity by the first connection and a VoIP audio function while being provided packet-switched access to the Internet via the second connection.

17. The method of claim 16, further comprising:
the mobile unit switching from the first connection to the second connection while substantially maintaining voice connectivity of a voice call with the remote telephony endpoint, to thereby provide a seamless call handoff of the voice call from the circuit-switched cellular network to the packet-switched wireless local area network.

18. For use in a system comprising at least a first wireless access point that uses a first air interface protocol and a second wireless access point that uses a second air interface protocol, wherein the first and second wireless access points are coupled to at least respective members of the group consisting of an Internet and a terrestrial cellular communications network, at least one member of the group consisting of the mobile unit, the first wireless access point and the second wireless access point communicates via the Internet at a transport layer or above with a remote server system to facilitate a system-level handoff operation from the first wireless access point to the second wireless access point, and the mobile unit couples to a remote telephony endpoint via a first connection between the mobile unit and the first wireless access point prior to the system-level handoff operation, a method comprising:
receiving at the remote server system an indication that the second wireless access point is a potential point of attachment for the mobile unit;
determining whether a second connection between the mobile unit and the second wireless access point is preferable to the first connection, wherein the determining is performed in accordance with an optimization strategy; and
the mobile unit, in response to an indication from the remote server system, switching a wireless access call leg from the first connection to the second connection;
wherein the switching includes reconfiguring a protocol stack in the mobile unit by changing between at least one first protocol-stack lower layer that implements at least a portion of the first air interface protocol and at least one second protocol-stack lower layer that implements at least a portion of the second air interface protocol, and by changing between at least one first upper layer function that implements at least a portion of a circuit switched voice telephony audio processing function and at least one second upper layer that implements at least a portion of a packet switched voice-over-Internet (VoIP) telephony audio processing function;
wherein one of the first and second air interface protocols is a circuit-switched terrestrial cellular voice telephony air interface protocol and the other one of the first and second air interface protocols is a packet-switched wireless local area network air interface protocol that supports the transmission of VoIP packets; and
wherein the switching from the first connection to the second connection is performed while substantially maintaining voice connectivity of a voice call between the mobile unit and the remote telephony endpoint, and the voice call passes through the wireless access call leg both before and after the switching, to thereby provide a seamless call handoff of the voice call.

19. The method of claim 18, wherein:
the first air interface protocol is the circuit-switched terrestrial cellular communications air interface protocol, the second air interface protocol is the packet-switched wireless local area network air interface protocol, the first wireless access point is a part of the terrestrial cellular communications network, the second wireless access point uses a low power radio transceiver that has a local coverage area less than one quarter mile, and the first wireless access point has a wide coverage area substantially larger than the local coverage area.

20. The method of claim 18, wherein:
the first air interface protocol is the packet-switched wireless local area network air interface protocol, the second air interface protocol is the circuit-switched terrestrial cellular communications air interface protocol, the first wireless access point uses a low power radio transceiver that has a local coverage area less than one quarter mile, the second wireless access point is a part of the terrestrial cellular communications network, and the second wireless access point has a wide coverage area substantially larger than the local coverage area.

21. The method according to claim 18, wherein the wireless local area network comprises a plurality of wireless access points, and the plurality of wireless access points are interconnected into a subnetwork configuration that supports a local subnetwork level roaming protocol to allow the mobile unit to roam among different ones of the plurality of wireless access points without involving the remote server system.

22. The method according to claim 18, wherein the terrestrial cellular communications network and the wireless local area network are operated by different service providers.

23. The method according to claim 18, wherein the Internet is a member of the group consisting of the ubiquitous global Internet, a corporate intranet, an intranet, a virtual private network, and a virtual private network that is embedded within another network.

24. The method according to claim 18, further comprising:
the mobile unit receiving a temporary Internet address in accordance with a mobile Internet Protocol (Mobile IP) for use while the mobile unit is connected to the second wireless access point.

25. The method according to claim 18, wherein the remote server system includes a session initiation protocol (SIP) server component to support at least one voice-over-Internet telephony call leg between the mobile unit and the remote telephony endpoint.

26. The method according to claim 18, wherein:
the remote server system includes a session initiation protocol (SIP) server component to support at least one voice-over-Internet telephony call leg between the mobile unit and the remote telephony endpoint; and
the indication is produced as the remote server system implements at least one of a sequence of steps of a protocol in support of the seamless call handoff.

27. The method according to claim 18, wherein:
the remote server system includes a session initiation protocol (SIP) server component to support at least one voice-over-Internet telephony call leg between the mobile unit and the remote telephony endpoint; and
the remote server system comprises a roam management server that maintains a roam management session at the transport layer or above with the mobile unit.

28. The method according to claim 18, wherein the determining is performed by the remote server system.

29. The method according to claim 28, wherein the optimization strategy takes into account at least one user preference.

30. The method according to claim 29, wherein the at least one user preference includes at least a cost of service criterion and a connection speed criterion.

31. The method according to claim 28, further comprising:
receiving from the mobile unit a feedback data related to a current network performance measure, wherein the feedback data includes network information related to current network loading conditions, and the optimization strategy takes into account the feedback data.

32. The method according to claim 31, further comprising:
the remote server system collecting a second feedback data indicative of current network loading conditions from a plurality of wireless access points provided by a plurality of different service provider networks;
wherein the optimization strategy takes into account the current network loading conditions, at least one user preference, and a cost variable related to a cost for the mobile unit to connect to the different ones of the plurality of different service provider networks.

33. The method according to claim 18, wherein the optimization strategy takes into account at least one user preference.

34. The method according to claim 18, wherein the at least one user preference includes at least a cost of service criterion and a connection speed criterion.

35. The method according to claim 18, wherein the remote server system is implemented on one or more server platforms and includes a mobile unit authentication function.

36. The method according to claim 35, wherein the remote server system further includes an accounting function.

37. The method according to claim 36, wherein the accounting function maintains a record of an amount of usage by the mobile unit of different ones of a plurality of different wireless access network service providers that each supply one or more wireless access points.

38. The method according to claim 37, wherein the accounting function further maintains a record of an amount of usage of a cellular network by the mobile unit.

39. The method according to claim 36, wherein the accounting function maintains a database of user account information which includes billing arrangements with a plurality of wireless access service providers.

40. The method according to claim 35, wherein the indication is conditionally produced in accordance with the authorization function.

41. The method according to claim 18, wherein the first wireless access point and the second wireless access point are operated by different wireless access service providers and the remote server system includes a function that keeps track of money owed to each for providing wireless access services.

42. The method according to claim 41, wherein the roam management server system manages revenue sharing between the different wireless access service providers.

* * * * *